United States Patent [19]

Ruell

[11] 4,355,238

[45] Oct. 19, 1982

[54] LIQUID LEVEL INDICATOR

[75] Inventor: Hartwig Ruell, Fürstenfeldbruck, Fed. Rep. of Germany

[73] Assignee: Siemens Corporation, Iselin, N.J.

[21] Appl. No.: 236,277

[22] Filed: Feb. 20, 1981

[51] Int. Cl.³ .......................................... G01N 15/06
[52] U.S. Cl. ..................................... 250/577; 73/293
[58] Field of Search ............... 250/577, 573, 574, 575; 73/293

[56] References Cited

FOREIGN PATENT DOCUMENTS 2034344 7/1970 Fed. Rep. of Germany.

OTHER PUBLICATIONS

K. A. James et al., "Fiber Optics: The Way to True Digital Sensors?", *Control Engineering*, Feb. 1979, pp. 30–33.

*Primary Examiner*—David C. Nelms
*Assistant Examiner*—Darwin R. Hostetter
*Attorney, Agent, or Firm*—Karl F. Milde, Jr.

[57] ABSTRACT

The liquid level indicator contains a number of first light fibers, a number of second light fibers, optical lens means interposed between each output end of the first fibers and an associated input end of the second fibers, and light detectors associated with the output ends of the second fibers. The optical lens means has substantially the same index of refraction as the liquid. When the lens means is not immersed into the liquid, it focusses light from the first fiber to the second fiber. This focussing effect is eliminated when the lens is submerged into the liquid.

10 Claims, 3 Drawing Figures

LIQUID LEVEL INDICATOR

BACKGROUND OF THE INVENTION

1. Field of the Invention

This invention relates to a novel liquid level indicator which senses the height of a liquid level at a first location which is remote from a second location where the sensed height is indicated. In particular, this invention relates to a liquid level indicator which incorporates fiber optical signal transmission concepts.

2. Description of the Prior Art

During the recent years fiber optical signal transmission has become a significant technological innovation in electronic systems. Among the reasons for preference of fiber optical signal transmission to the former electric signal transmission is the availability of additional bandwidth combined with the elimination of electromagnetic interferences. Other reasons include the convenient separation of the electric potentials of various system components.

Fiber optical transmission has been used for medium and long distance communication and for digital data transmission in certain industry applications where electromagnetic interference or electric separation is of special significance. Fiber optical transmission lines have also been used in connection with high voltage switching, power plant control and process control of electric furnaces. The application in aircraft and in automobiles is also known.

In control systems signal communication in digital form is performed not only between data processing units, but also between data processing units and input and/or output devices. Special signal sensitivity exists between sensors and data processing devices. Therefore, fiber optical communication on a digital basis has been used for signal transmission between sensors and the control and/or processing system (Control Engineering, February 1979, pages 30–33). The sensor devices serve to acquire input information relative to physical parameters which are of significance for the control and/or processing system, such as temperature, pressure, position, flow, speed, level of a liquid, etc.

In the German Offenlegungsschrift No. 2,034,344, FIGS. 7a–7i, a liquid level indicator is disclosed which uses fiber optical signal transmission. In this prior art indicator, light passes through a curved fiber. When the bow or bend of the fiber is immersed into the liquid, the light within the fiber is no longer totally reflected in this region. The light transmitted through the fiber suffers a loss, the quantity of which is dependent upon the depth of immersion. The transmitted intensity may be measured by an electric light detector. Its output signal, that is an analog signal, may be further processed. The range of level height that can be measured with this prior art indicator is limited.

For many purposes it is desirable to have a digital or quasi-digital signal as indication signal for the depth of immersion or the height of the liquid level. In addition, it is desirable to design a liquid level indicator that can operate over a large range of levels.

SUMMARY OF THE INVENTION

Objects

It is an object of this invention to provide a fiber optical liquid level indicator that provides a quasi-digital indication signal.

It is another object of this invention to provide a fiber optical liquid level indicator that is applicable for the measurement of a large range of liquid level heights.

Summary

According to this invention, a liquid level indicator contains a plurality, preferably a large number, of first light transmitting fibers. Each fiber has a first light input end for receiving light and a first light output end for delivering light transmitted therethrough. The first light output ends are arranged one above the other such that they may be immersed into the liquid.

The liquid level indicator also contains a plurality of second light transmitting fibers, preferably the same in number as the first light transmitting fibers. Each of these second light transmitting fibers has a second light input end for receiving light and a second light output end for delivering light transmitted therethrough. The second light input ends are also arranged one above the other such that they may be immersed into the liquid. Each of these second light input ends is associated with one of the first light output ends in order to receive light therefrom.

The liquid level indicator further contains an optical lens device which is interposed between each of the first light output ends and its associated second light input end. This optical lens device receives light from the first light output end. When the optical lens device is not immersed into the liquid, it will focus the received light onto the associated second light input end. The optical lens device has substantially the same index of refraction as the liquid. Therefore, the lens device will lose its focusing effect when it is immersed into the liquid. In other words, when the level has risen such that the optical lens device dips into the liquid, the associated second light input end will receive substantially less light intensity than before.

The liquid level indicator also contains a plurality of light detectors, preferably one for each of the second light transmitting fibers. Each of these light detectors is associated with one of the second light output ends of the second light transmitting fibers in order to receive light therefrom. The distribution of the output signals of these light detectors is an indication of the level of the liquid.

The foregoing and other objects, features and advantages of the invention will be apparent from the following more particular description of preferred embodiments of the invention, as illustrated in the accompanying drawings.

BRIEF DESCRIPTION OF THE DRAWINGS

For the same or equivalent components and elements, the same reference numerals are used in FIGS. 1 through 3.

In the drawings.

DETAILED DESCRIPTION OF THE PREFERRED EMBODIMENTS

Figure 1:
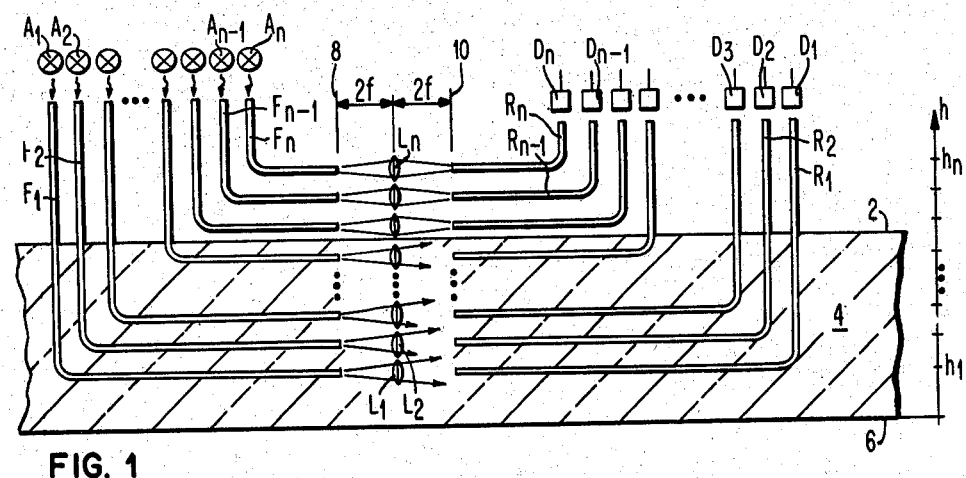
FIG. 1 is an embodiment of a liquid level indicator containing an individual lens for each set of first and second light transmitting fibers.

In FIG. 1 is illustrated an indicator for sensing the surface or level 2 of a liquid 4, for instance in a container such as a barrel or tank. Of interest is the level height h above a predetermined ground level 6. The height h is subject to changes, for instance, because of refilling the container. The liquid level indicator utilizes as indication principle the difference in the index of refraction of the liquid 4 on the one hand and of the liquid free environment on the other hand. The illustrated liquid level indicator is applicable for the indication of level heights h which may vary to a large extent. The indicator may also be used for indication of large immersion depths.

According to FIG. 1, a number n of light sources $A_1$, $A_2, \ldots, A_{n-1}, A_n$ is provided. These light sources $A_1$–$A_n$ may be, for instance, light emitting diodes (LED).

The light sources $A_1, A_2, \ldots, A_n$ direct their light to the input ends of n transmitter fibers or first light transmitting fibers $F_1, F_2, \ldots, F_{n-1}, F_n$, respectively. The light intensities emitted from the light output ends of the fibers $F_1, F_2, \ldots, F_n$ are all the same. These output ends are arranged one above the other so that they may be immersed one after the other into the liquid when the level 2 is raised from the bottom line 6. In particular, the light output ends are positioned along a first vertical straight line which is designated by the reference numeral 8.

It will be noted that the end portions of the fibers $F_1$–$F_n$ are arranged horizontally, whereas their input portions extend substantially vertically into the surface 2 of the liquid. The liquid level indicator also contains a number of n receiver fibers or second light transmitting fibers $R_1, R_2, \ldots, R_{n-1}, R_n$. The light input ends of these second fibers $R_1, R_2, \ldots, R_n$ are also arranged one above the other so that they may be immersed into the liquid 4. In particular, the second light input ends are each positioned along a second vertical line which is designated by the reference numeral 10. Each of these second light input ends is associated with one of the first light output ends of the first fibers $F_1, F_2, \ldots, F_n$. For instance, the light output end of the first fiber $F_{n-1}$ is arranged directly opposite to the light input end of the corresponding second fiber $R_{n-1}$. The end portions of the fibers $F_{n-1}$, $R_{n-1}$ are arranged horizontally.

The number n of the sets $F_n$, $R_n$ depends on the range of the level 2 which shall be covered and on the increments which are admissable.

Interposed between each first light output end and its associated second light input end is an optical lens $L_1$, $L_2, \ldots, L_{n-1}, L_n$. These lenses $L_1$–$L_n$ all have the same positive focal length. In particular, there is provided as lenses $L_1, L_2, \ldots, L_n$ a number n of individual double convex lenses. The material of these lenses $L_1, L_2 \ldots$, $L_n$ is chosen such that their index of refraction equals or does not differ too much from the index of refraction of the liquid 4.

The light leaving the first output ends is focussed by the lenses $L_1, L_2, \ldots, L_n$ to the second input ends when these optical lenses $L_1$–$L_n$ are not immersed into the liquid 4. This can be seen in FIG. 1 from the light paths including the upper three lenses $L_n$, $L_{n-1}$, $L_{n-2}$.

Due to the selected index of refraction, the optical lenses $L_1$–$L_n$ will lose their focussing effect when they are immersed into the liquid 4. This can be seen in FIG. 1 from the radiation paths of the lower four lenses $L_1$, $L_2, L_3, \ldots, L_{n-4}$. In other words: the optical lenses $L_1$, $L_2, L_3, \ldots L_{n-3}$, which have been covered by the liquid 4 can no longer focus the light into the second fibers $R_1$, $R_2, R_3, R_{n-3}$, respectively. The received light intensity is only small. Yet, the lenses $L_{n-2}, L_{n-1}$, and $L_n$ which are not submerged into the liquid 4, still couple light into the three receiver fibers $R_{n-2}$, $R_{n-1}$ and $R_n$, respectively, which are allocated to them. Therefore, the received light intensities are high.

In order to measure or determine the height h of the level 2 of the liquid 4, the intensities of the radiation which is fed into the receiver fibers $R_1, R_2, \ldots, R_n$ are measured and compared with each other or with given values.

It has already been mentioned that the input end portions of the second light transmitting fibers $R_1, R_2, \ldots, R_n$ extend horizontally, that is parallel to the surface 2. The output end portions emerge vertically out of the liquid surface 2.

Associated with each of the second light output ends of the second light transmitting fibers $R_1, R_2, \ldots, R_{n-1}$, $R_n$ is a light detector $D_1, D_2, \ldots, D_{n-1}, D_n$, respectively. These light detectors $D_1$–$D_n$ measure the intensity of the light arriving from the associated light source $A_1, A_2, \ldots, A_{n-1}, A_n$, respectively.

Figure 2:
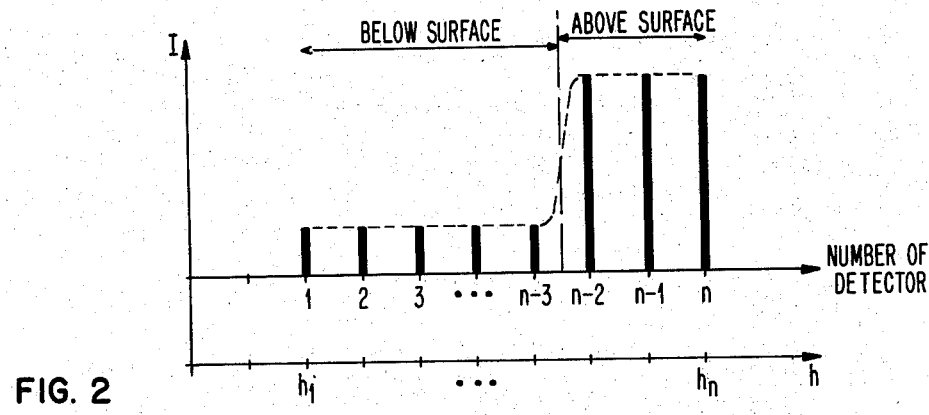
FIG. 2 is a diagram showing the detector output intensity distribution and therefore the level height which is indicated by the embodiment according to FIG. 1.

In FIG. 2, the light intensity distribution I measured by the individual light detectors $D_1, D_2, \ldots, D_n$ of FIG. 1 is illustrated in dependance on the number $1, 2, \ldots$, n of the respective detector. As will be noted, in the embodiment of FIG. 1 the detectors having the numbers $1, 2, 3, \ldots, n-3$ are below the surface 2. Since the focussing effect is lost, the measured intensities I are relatively low. However, the three detectors $D_{n-2}$, $D_{n-1}$ and $D_n$ having the numbers $n-2$, $n-1$ and n, respectively, are above the surface 2. Due to the focussing effect of the lenses $L_{n-2}, L_{n-1}, L_n$, the measured intensities I of these detectors are high.

As illustrated in FIG. 1, the lenses $L_1, L_2, \ldots, L_n$ are arranged in a straight vertical line. Preferably they are arranged in the middle section between the ends of the corresponding fiber set F, R. Preferably, the sensitivity may be increased if the distance between the fiber ends and the principal plane of the lens L is twice the focal length f, as indicated in FIG. 1. This is the condition for 1:1 imaging.

Figure 3:
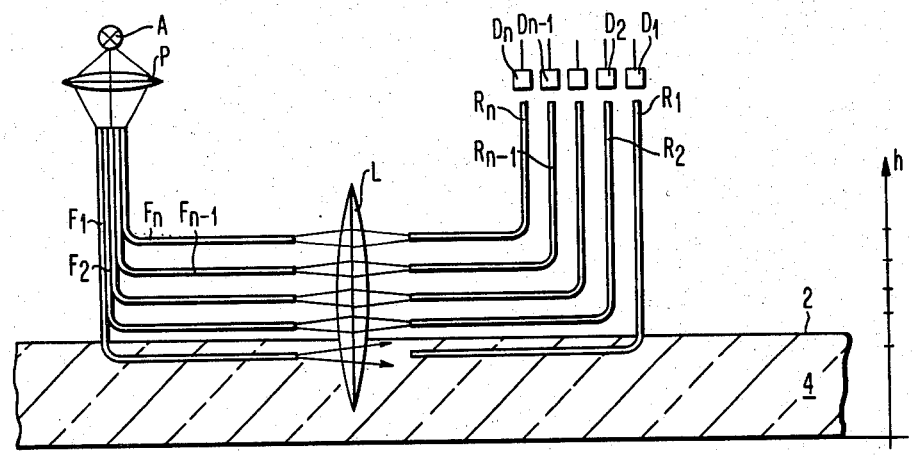
FIG. 3 is a second embodiment of a liquid level indicator containing a common lens for all sets of first and second light transmitting fibers.

In the embodiment according to FIG. 1, various lenses $L_1, L_2, \ldots, L_n$ are shown. If only a small range of height h of the level 2 has to be covered, a common single lens L may be used for all fiber sets F, R. This is illustrated in FIG. 3. In this embodiment, only the lower portion of the common lens L is immersed into the liquid 4. Therefore, only the focussing effect relating to the first fiber set $F_1$, $R_1$ is offset. The lens L may be, for instance, a bi-convex lens, as illustrated.

In FIG. 3 is also shown that the liquid level indicator may contain a single light source A for emitting light to all n first fibers $F_1, F_2, \ldots, F_n$. The light is focussed by a focussing device P onto the light input ends of the first fibers $F_1, F_2, \ldots, F_n$. These input ends may preferably be bundled together. The focussing device P may be a lens system.

While the forms of the liquid level indicator herein described constitute preferred embodiments of the invention, it is to be understood that the invention is not limited to these precise forms of assembly, and that a variety of changes may be made therein without departing from the scope of the invention.

What is claimed is:

1. A liquid level indicator, comprising in combination:
   (a) a plurality of first light transmitting fibers each having a first light input end for receiving light and each having a first light output end for delivering light transmitted therethrough, said first light output ends being arranged one above the other for being immersed into said liquid;
   (b) a plurality of second light transmitting fibers each having a second light input end for receiving light and a second light output end for delivering light transmitted therethrough, said second light input ends being arranged one above the other for being immersed into said liquid, and each of said second light input ends being associated with one of said first light output ends for receiving light therefrom;
   (c) optical lens means interposed between each first light output end and its associated second light input end for receiving light from said first light output end and focussing said light onto said associated second light input end when said optical lens means is not immersed into said liquid, said optical lens means having substantially the same index of refraction as said liquid, thereby losing its focussing effect when being immersed into said liquid; and
   (d) a plurality of light detectors each associated with one of said second light output ends of said second light transmitting fibers for receiving light therefrom.

2. The liquid level indicator according to claim 1, further comprising a plurality of light sources, each associated with one of said first light input ends, for emitting light to said first light input ends.

3. The liquid level indicator according to claim 1, further comprising a single light source for emitting light to all said first light input ends.

4. The liquid level indicator according to claim 1, wherein an individual lens is arranged between each of said first light output ends and each of said associated second light input ends.

5. The liquid level indicator according to claim 1, wherein a common lens is arranged between said first light output ends and said second light input ends.

6. The liquid level indicator according to claim 1, wherein said lens means comprises at least one double convex lens.

7. The liquid level indicator according to claim 1, wherein said lens means has a positive focal length, and wherein said first light output ends and said second light input ends are each positioned at approximately twice the focal length away from said lens means.

8. The liquid level indicator according to claim 1, wherein said first light output ends and said second light input ends are each positioned in a first and a second line, respectively, which lines are arranged perpendicularly to the surface of said liquid.

9. The liquid level indicator according to claim 1, wherein said first light transmitting fibers pass through the surface of said liquid.

10. The liquid level indicator according to claim 1, wherein said second light transmitting fibers pass through the surface of said liquid.

* * * * *